(12) United States Patent
Luo et al.

(10) Patent No.: US 12,743,302 B2
(45) Date of Patent: Sep. 22, 2026

(54) SYSTEMS AND METHODS FOR RETIRING IN MULTI-STREAM DATA MOVEMENT

(71) Applicant: Microsoft Technology Licensing, LLC, Redmond, WA (US)

(72) Inventors: Yi Luo, Issaquah, WA (US); Jinwen Xi, Sunnyvale, CA (US); Xuan Zuo, Redmond, WA (US); Haishan Zhu, Bellevue, WA (US); Eric Sen Chung, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 972 days.

(21) Appl. No.: 17/971,523

(22) Filed: Oct. 21, 2022

(65) Prior Publication Data

US 2024/0134683 A1 Apr. 25, 2024
US 2024/0231894 A9 Jul. 11, 2024

(51) Int. Cl.
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS 10,282,103 B1* 5/2019 Stone ...................... G06F 13/24
2003/0145136 A1* 7/2003 Tierney .............. G06F 13/1663 712/E9.048
2008/0209172 A1* 8/2008 Raikin .................. G06F 9/3858 712/203
2009/0307386 A1* 12/2009 Jin ........................ G06F 13/382 710/25
2013/0007418 A1* 1/2013 Fleischman ........... G06F 9/3865 712/216
2014/0282579 A1* 9/2014 Smiley .................. G06F 9/5027 718/104
2016/0179533 A1 6/2016 Gramunt
2016/0357608 A1* 12/2016 Gupta ................... G06F 9/3854

FOREIGN PATENT DOCUMENTS

WO WO-0029943 A1 * 5/2000 ........... G06F 9/3842
WO WO-0135225 A1 * 5/2001 ......... G06F 12/1036

OTHER PUBLICATIONS

Capalija et al. "Microarchitecture of a Coarse-Grain Out-of-Order Superscalar Processor" Feb. 2013 IEEE vol. 24 pp. 1-14.*
International Preliminary Report on Patentability received for PCT Application No. PCT/US2023/031928, May 1, 2025, 7 pages.
International Search Report and Written Opinion received for PCT Application No. PCT/US23/031928, Nov. 16, 2023, 12 pages.

* cited by examiner

*Primary Examiner* — Charles E Anya

(57) ABSTRACT

A hardware retire circuit includes: one or more input queues, each queue corresponding to an input stream of tasks and being configured to store input task identifiers corresponding to tasks of the input stream; and processing logic configured to: receive a completed task event; determine whether a completed task queue identifier and a completed task identifier of the completed task event match an input task identifier of an input task at a head of an input queue having an input queue identifier corresponding to the completed task queue identifier; and in response to determining a match, pop the task at the head of the input queue and output a task retirement event corresponding to the input task.

20 Claims, 10 Drawing Sheets

SYSTEMS AND METHODS FOR RETIRING IN MULTI-STREAM DATA MOVEMENT

BACKGROUND

Modern computing systems can perform work on workloads made up of a sequence of tasks. Processing systems or data movement hardware may process these sequences of tasks out of order, which can help increase overall throughput. For example, when different tasks do not depend on each other, they can be performed in parallel, where the tasks may finish at different times. In many software programming models, these tasks need to be re-ordered back to their input order once they have been completed, even if they were performed out-of-order, where the re-ordering may be referred to as retiring the tasks or applying in-order retirement to the tasks.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the present technology relates to methods and systems for multi-stream retiring. Some aspects relate to a hardware retire circuit configured to track the input orders of tasks in multiple parallel streams and re-order the results into the input orders as those tasks are completed out-of-order. For example, stream A may include tasks A1, A2, and A3, stream B may include tasks B1, B2, and B3 and stream C may include tasks C1, C2, and C3. A hardware retire circuit according to an example of the present technology may track the input orders of these tasks in association with their respective streams, and this workload may be performed by another processing circuit (e.g., a specialized compute accelerator and/or a data movement engine such as a direct memory access controller). The other processing circuit reports the completions of these tasks to the hardware retire circuit, which tracks these completions and matches the completions with the corresponding tracked input tasks such that the hardware retire circuit presents the results of the computations to a software stack in an order that is consistent with the orders of the streams (e.g., where tasks A1, A2, and A3 from stream A appear in order, tasks B1, B2, and B3 from stream B appear in order, and tasks C1, C2, and C3 from stream C appear in order, and where tasks A1, A2, and A3, tasks B1, B2, B3, and tasks C1, C2, C3 can be interleaved.

In some examples of the present technology, the hardware retire circuit maintains a queue or first-in-first-out (FIFO) for each of the input streams and maintains a queue or FIFO of tasks that are ready-to-retire (e.g., indicated as being completed). The hardware retire circuit retires a task at the head of the ready-to-retire FIFO when it matches a task at the head of one of the input stream FIFOs. When the task at the head of the ready-to-retire FIFO does not match any of the tasks at the heads of the input stream FIFOs, then the task is removed from the ready-to-retire FIFO and tracked for later retirement once its corresponding task appears at the head of an input stream FIFO. Accordingly, the hardware retire circuit tracks the completion of tasks and retires the tasks in an order consistent with the input order of those tasks. Some aspects of the present technology relate to a multi-threaded retire circuit where the retirement of tasks of each input stream is managed by a separate thread or separate processing circuit within the hardware retire circuit.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1:
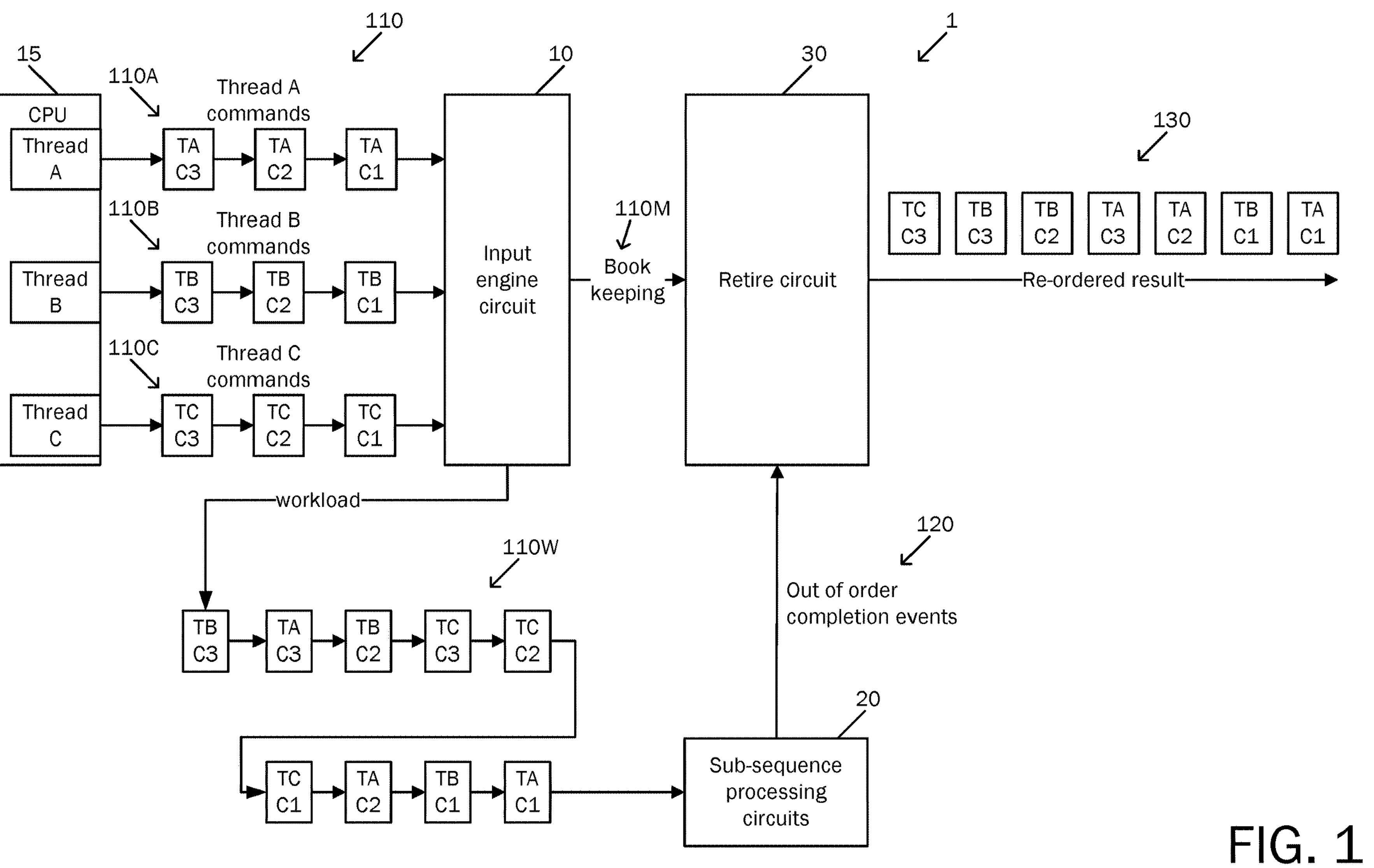
FIG. 1 depicts a high-level diagram of the input of multiple streams of tasks to an input engine circuit of a hardware accelerator and a re-ordering of a result produced by the hardware accelerator by a hardware retire circuit according to one example.

The following detailed description refers to the accompanying drawings. Wherever possible, the same reference numbers are used in the drawing and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

The present technology relates to methods and systems for multi-stream retiring. Some aspects relate to a hardware retire circuit configured to track the input orders of tasks in multiple parallel streams and re-order the results into the input orders for the corresponding streams as those tasks are completed out-of-order.

As one example, a hardware accelerator such as a graphics processing unit (GPU) or an artificial intelligence (AI) accelerator may receive computing tasks and perform computations on those input workloads. These workloads may include, for example, large matrix multiplications and applications of activation functions, in the case of workloads for training artificial intelligence models such as deep neural networks. In many cases, these tasks are highly parallelizable and can be distributed across multiple parallel compute units within a GPU or an A1 accelerator. Depending on the shape of the input data (e.g., the dimensions of the input matrixes), it is possible that a single given task may not be able to use all the compute units within the hardware accelerator, in which case the remaining compute units may be used to process other tasks in parallel. In addition, different tasks may require different total amounts of computing effort (e.g., a different number of total clock cycles) to complete those tasks. As a result, submitting a sequence of multiple tasks to a hardware accelerator may cause the results of those tasks to be output by the hardware accelerator in a different order than the order in which they were submitted.

Similarly, a data movement engine such as a direct memory access (DMA) engine may receive commands to copy data between source and destination locations of different devices on an interconnect without passing through the core of a processor. For example, data may be copied from a main memory to dedicated memory of a hardware accelerator, or from a network controller to a main memory, or from a storage device (e.g., solid state drive) to the video memory dedicated to a graphics processing unit, or the like. These data movement tasks may have different total sizes, may occur between devices having different maximum transfer rates, and over connections that may have different transfer speed bottlenecks. As such, multiple transfers may be processed concurrently, where different tasks may finish at different times based on these factors. Therefore, submitting multiple data transfer tasks or commands to a DMA engine may similarly result in the out-of-order completion of these tasks.

Computer programming languages and computing environments generally present their users (e.g., computer programmers) with software programming models that assume that tasks are completed in-order or maintain the appearance of being completed in order, even if the computing tasks were performed out-of-order. For example, a user may write a program that specifies performing task 1, then task 2, then task 3. However, as noted above, submitting these tasks to be performed by a hardware accelerator or other computing device may cause these tasks to be performed out of order. As such, a retirement mechanism retires the tasks in the order that they were submitted (task 1, then task 2, then task 3), such that the behavior of the overall system is consistent with the software programming model presented to the user. In some cases, multiple different threads generate corresponding streams of tasks that are all submitted to the same hardware acceleration system.

FIG. 1 depicts a high-level diagram of the input of multiple streams of tasks to an input engine circuit of a hardware accelerator 1 and a re-ordering of a result produced by the hardware accelerator by a hardware retire circuit according to one example. As shown in FIG. 1, a DMA input engine circuit or an input engine circuit 10 receives input tasks or commands 110 from a computer processor or central processor or CPU 15. These tasks or commands may be generated by one or more computational threads being executed by the CPU 15 connected to the hardware accelerator 1 over an interconnect or bus (e.g., a peripheral component interconnect express or PCIe bus). These computational threads may correspond to parts of one or more running programs that are generating commands that are offloaded from the processor onto the hardware accelerator 1. In the example shown in FIG. 1, three threads (Thread A, Thread B, and Thread C) running on the CPU 15 submit respective streams of commands to the hardware accelerator 1, where those streams include Stream A 110A with commands or tasks TAC1, TAC2, and TAC3, Stream B 110B with commands or tasks TBC1, TBC2, and TBC3, and Stream C 110C with commands or tasks TCC1, TCC2, and TCC3. The commands in each stream provided by the CPU 15 may be associated with corresponding stream identifiers (e.g., Stream A, Stream B, and Stream C) and corresponding command identifiers (e.g., C1, C2, and C3).

The input engine circuit 10 may include arbitration logic to serialize the multiple streams of tasks received in parallel and provides the serialized workload 110W to processing circuits or sub-sequence processing circuits 20 (e.g., logic circuits and/or specialized accelerators). The task received from the input threads can be interleaved when supplied as the workload 110W to the processing circuits 20. For example, FIG. 1 shows the tasks as being provided in the order TAC1, TBC1, TAC2, TCC1, TCC2, TCC3, TBC2, TAC3, and TBC3.

The processing circuits 20 may complete the commands or tasks out of order (e.g., in a different order than the order in which the tasks were supplied to the input engine circuit). As such, the hardware accelerator 1 includes a retire circuit 30 that re-orders the results generated by the processing circuits 20. In more detail, the retire circuit 30 generates task completion events 130 that report the completion of the commands by the hardware accelerator 1, as identified based on the stream identifier and command identifier supplied by the CPU 15.

In more detail, the retire circuit 30 receives book-keeping information 110M from the input engine circuit 10 regarding the input streams of tasks and receives events from the processing circuits 20 as the tasks are completed. For example, the book-keeping information 110M may include a task identifier for each incoming task (where the task identifier is unique among all tasks currently visible to the hardware accelerator), and the input engine circuit 10 may tag the tasks of the workload 110W using those task identifiers. As the processing circuits 20 complete the tasks, it generates events 120 to indicate that those tasks are complete, where each event is tagged with a task identifier corresponding to the completed task. The retire circuit 30 then generates the re-ordered task completion events 130 such that the completion of the tasks or commands 110 are reported to the threads running on the CPU 15 in a sequential order that is consistent with the order in which the events were input to the hardware accelerator 1. For example, the results and/or the completion of the tasks may be reported using a signal semaphore, such as by setting a value in memory connected to the CPU 15 and the hardware accelerator 1 or setting a value in some other location accessible to the CPU 15.

In the example shown in FIG. 1, the results are returned in the order TAC1, TBC2, TAC2, TAC3, TBC2, TBC3, and TCC3, noting that this ordering is different from the ordering of the tasks of the workload and that some tasks (e.g., tasks TCC1 and TCC2 are omitted to improve performance as described in more detail below). In more detail, the retire circuit 30 ensures that all tasks within a same sequence are output in the same order in which the tasks were input (e.g., the result of TAC1 is output before the results of TAC2 and TAC3, and the result of TAC2 is output before the result of TAC3), but may interleave the results from different streams (e.g., Stream A, Stream B, and Stream C), such as where TBC1 from Stream B is retired between TAC1 and TAC2.

Some sub-sequences of multiple tasks need only one retire output for the entire sub-sequence. For example, for a sub-sequence of data movement tasks where the source and the destination are the same across all of the tasks of the sub-sequence and where the data movements are processed in order, the software programming model of task execution may be satisfied by generating only one retire output after all of tasks of the sub-sequence have been completed. In the example shown in FIG. 1, tasks TCC1, TCC2, and TCC3 of Stream C form one such sub-sequence of tasks. In some examples of the present technology, the retire circuit 30 detects that a sub-sequence satisfies these circumstances (e.g., through metadata provided with the tasks) and generates one signal semaphore (e.g., T3C3) as the reordered result of performing tasks TCC1, TCC2, and TCC3, without also generating signal semaphores for the completions of TCC1 and TCC2 (which do not appear in the re-ordered task completion events 130), thereby enabling a performance improvement due to fewer tasks being reported back to the CPU 15.

Details of the operation of retire circuits according to various examples of the present technology will be presented in more detail below.

Figure 2:
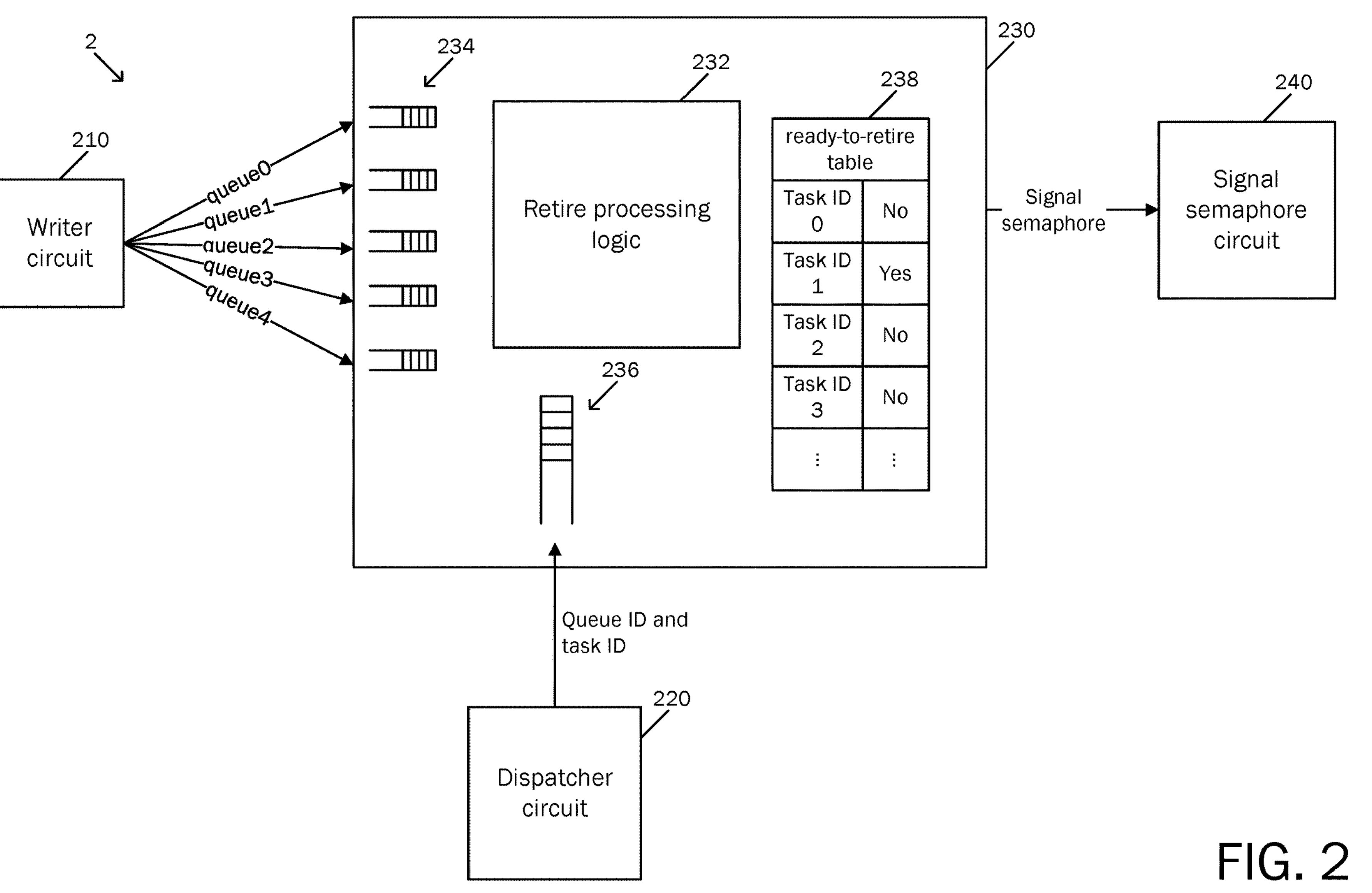
FIG. 2 is a block diagram depicting a retire circuit according to one example of the present technology.

FIG. 2 is a block diagram depicting a retire circuit according to one example of the present technology. A hardware accelerator 2 may be referred to herein as a Multi-hop Subcommand Controller (MSC) that includes a writer circuit 210 configured to arbitrate the input command streams received from the CPU (e.g., CPU 15 as shown in FIG. 1), a dispatcher circuit 220 (e.g., to pipeline the data movement in different on-chip memories and/or to perform computations associated with the tasks), and a retire circuit 230 configured to re-order the results and supply the results (or signals indicating the completion of tasks) to a signal semaphore circuit 240 to report the completion of the tasks back to the CPU. In various examples of the present technology, the hardware accelerator 2, including the writer circuit 210, the dispatcher circuit 220, the retire circuit 230, and the signal semaphore circuit 240, may be implemented using, for example, a custom fabricated integrated circuit, an application specific integrated circuit (ASIC), a field programmable gate array (FPGA), or the like, or combinations thereof, such as where different functionality of the hardware accelerator 2 is implemented by integrated circuits on the same semiconductor die or on different semiconductor dies, whether in the same semiconductor package or in different semiconductor packages. In examples of the present technology implemented in an FPGA, an integrated circuit, or an ASIC, a non-transitory, computer readable medium includes computer instructions that, when executed by a processor, cause the processor to configure the FPGA (e.g., a bitfile defining connections in an internal fabric of the FPGA, values in lookup tables of the FPGA, and the like) or configure the integrated circuit or ASIC (e.g., defining low level transistor material layouts or high-level hardware description languages) to implement the various components of examples of the present technology.

The retire circuit 230 includes a retire processing logic 232, which may be implemented using digital logic circuits such as an embedded microcontroller or other processing circuits configured to implement functionality according to the technology described herein. The writer circuit 210 writes incoming tasks or commands to various input queues 234 corresponding to different streams (e.g., streams of tasks submitted by different threads running on the CPU). This information (or book-keeping information or metadata) includes a task identifier or task ID associated with each task.

The example shown in FIG. 2 includes five input queues 234, labeled queue0 through queue4. However, the present disclosure is not limited thereto and the number of input queues included in the retire circuit 230 may be configured as appropriate for the workloads that will be managed by the hardware accelerator and as appropriate for tradeoffs between the number of queues, the maximum sizes of such queues (e.g., maximum number of tasks that can be stored in the queues), and the physical area consumed by the input queues in the retire circuit 230.

The dispatcher circuit 220 writes task completion events to a ready-to-retire queue 236 of the retire circuit 230 as those corresponding tasks are completed. These task completion events may include a queue identifier or queue ID that identifies the queue (or stream) that the task came from. For example, Stream A, which includes tasks TAC1, TAC2, and TAC3 as shown in FIG. 1, may be associated with queue1. Task TAC2 may also be assigned a task identifier (or task ID) such as task ID 3. When task TAC2 is completed, the dispatcher circuit 220 generates a task completion event for task TAC2, which includes its completed task ID (task ID 3) and an identification of its corresponding completed task queue (e.g., queue1). The task identifiers used internally by the hardware accelerator may be different from the command identifiers supplied by the CPU (e.g., the task identifiers may be assigned using a counter in the hardware accelerator). Likewise, the queue identifiers used internally by the hardware accelerator may be different from the stream identifiers supplied by the CPU (e.g., the queue identifiers may be permanently assigned to particular input queues of the hardware accelerator, but a stream of commands provided by the CPU can be dynamically assigned to an available input queue for the duration of execution of the stream).

A queue or first-in-first-out (FIFO) data structure is one in which provides access to data items enqueued or pushed into the queue in the order in which the data items were enqueued. The head of the queue refers to the item that was pushed in earliest (e.g., the item that has been enqueued for the longest period of time) and the tail of the queue refers to the item that was pushed in latest (e.g., most recently enqueued). Items can be dequeued or popped from the head of the queue, which removes the item from the queue such that the new head of the queue is the next-earliest pushed item. In some cases, such as where there is only one data item in the queue, the head and the tail both point to the same data item. The value of the item at the head of the queue may be inspected by peeking at the head, without dequeuing or popping the item from the head of the queue.

The retire circuit 230 may further include a ready-to-retire table 238 or ready-to-retire scoreboard stored in an integrated memory of the retire circuit 230, where the ready-to-retire table maps tasks to a status indicating whether the corresponding task is ready to retire. In some examples, if the task identifier is only unique within a stream, then the combination of a task identifier and its queue identifier is used to map onto a location (e.g., a bit) in the ready-to-retire table. In examples where the task identifier of a task is globally unique across all streams at any given time, then the task identifier can be used without the queue identifier to map to a location in the ready-to-retire table.

Figure 3:
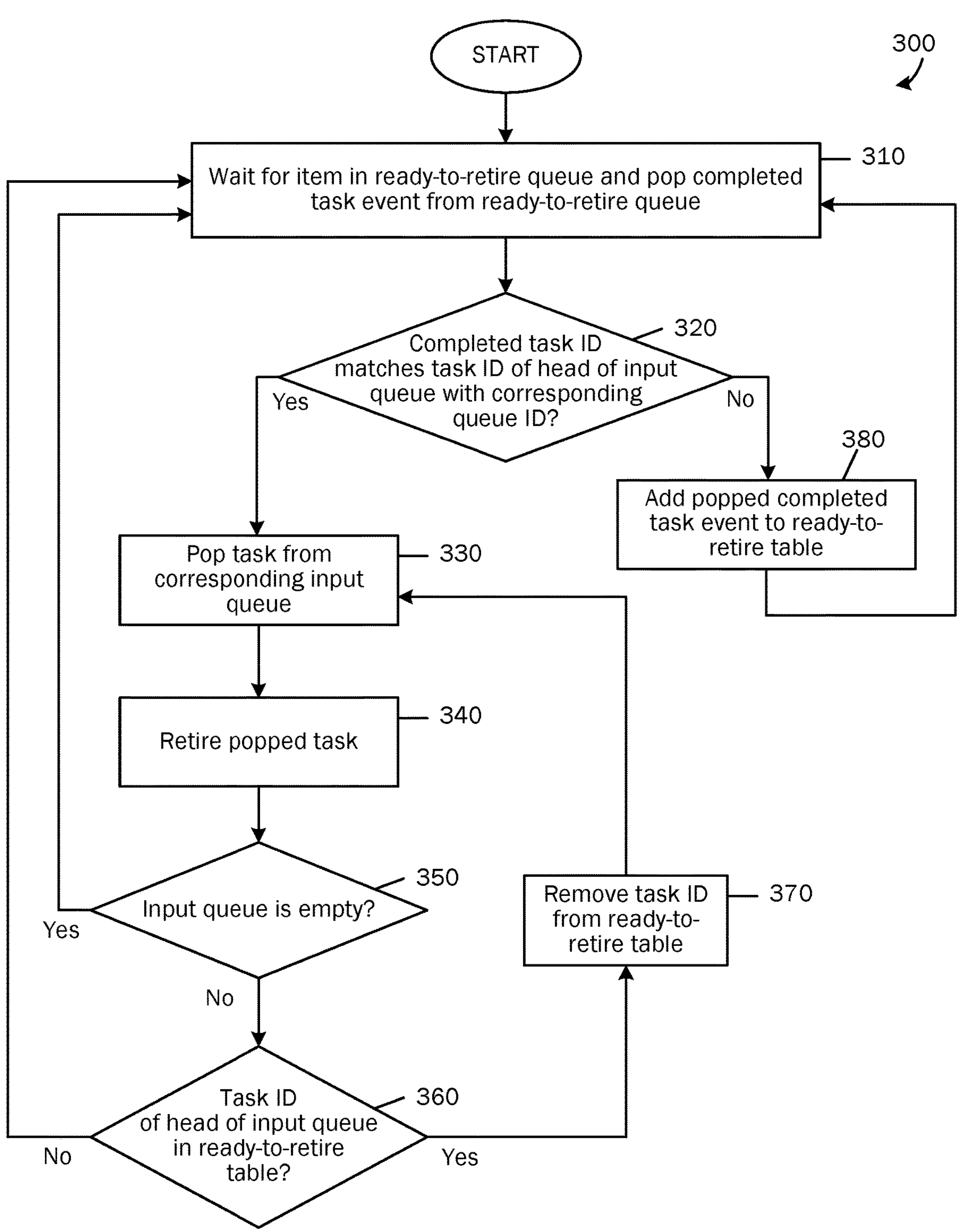
FIG. 3 is a flowchart of a method for tracking in-progress tasks and retiring tasks using a retire circuit according to one example of the present technology.

FIG. 3 is a flowchart of a method 300 for tracking in-progress tasks and retiring tasks using a retire circuit 230 according to one example of the present technology. At operation 310, the retire processing logic 232 waits for an item to appear in the ready-to-retire queue 236 and pops a completed task event from the ready-to-retire queue 236 when one is available. At operation 320, the retire processing logic 232 determines whether the completed task identifier from the completed task event matches the task identifier at the head of the input queue corresponding to the queue identifier from the completed task event. When the retire processing logic 232 detects a match at operation 320, then, at operation 330, the retire processing logic 232 pops the matching task from the head of the corresponding input queue 234, removes the task from the ready-to-retire table 238 (such as by setting the value of the entry in the table corresponding to the task identifier of the completed task to "No" or "False" or zero), and retires the popped task at operation 340, such as by sending a task retirement event (e.g., including identification of the stream that the task came from) to the signal semaphore circuit 240, which may report the completion of the task to the CPU.

At operation 350, the retire processing logic 232 checks whether the input queue that was popped at operation 330 is now empty. If so, then the retire processing logic 232 returns to wait for a completed task event to appear in the ready-to-retire queue 236. If the input queue is not empty, then at operation 360 the retire processing logic 232 checks whether the task identifier of the task at the head of the input queue appears in the ready-to-retire table 238 (e.g., if the entry corresponding to the task identifier is set to Yes). In a case where the task identifier at the head of the input queue does appear in ready-to-retire table 238 (e.g., where the status is set to "Yes" or "True"), then the retire processing logic 232 proceeds to remove the task identifier from the ready-to-retire table 238 (e.g., by setting the value associated with the task identifier to "No" or "False"), and then proceeding with popping the task from the head of the input queue at 330 and retiring the popped task at 340. The retire processing logic 232 proceeds along this loop, popping tasks from the input queue that are ready-to-retire based on corresponding entries in the ready-to-retire table 238, until the input queue is empty (as determined at operation 350) or until the task identifier of the task at the head of queue is not ready to be retired, at which point the processing logic 232 returns to wait for an item to appear in the ready-to-retire queue 236.

When there is no match between the task identifier of the completed task event and the task at the head of the corresponding input queue, then the task was completed before another event that appeared before the task in its input sequence of events. As such, at operation 380 the popped completed task event is added to the ready-to-retire table 238, such as by setting the row in the table corresponding to the task (e.g., based on the input task identifier and the queue identifier) of the completed task to "Yes" or "True." The retire processing logic 232 then loops back to operation 310 to continue waiting for a completed task event to be enqueued onto the ready-to-retire queue 236.

The examples of the present technology described above with respect to FIG. 2 and FIG. 3 are capable of performing retiring of out-of-order execution of multi-stream tasks using a single-threaded hardware retire circuit. In some implementations, it may take many clock cycles for the retire processing logic 232 to poll those input queues 234 and check the ready-to-retire table 238, as also compare the head of the ready-to-retire queue 236 against heads of the input queues 234. In addition, increasing the number of input queues 234 adds to the number of clock cycles needed for each loop of the method shown in FIG. 3, because the single-threaded retire processing logic 232 checks only one input queue 234 at a time. Therefore, depending on the tradeoffs between workload patterns of the hardware accelerator, hardware complexity of the hardware retire circuit, and clock rate of the hardware retire circuit, a single threaded approach may not be able to retire tasks sufficiently quickly to handle the overall throughput of an out-of-order hardware accelerator.

Accordingly, some aspects of examples of the present technology relate to a multi-threaded retire circuit in which multiple threads of the retire circuit execute in parallel to detect whether the task at the head of each input queue can be retired and to handle the retiring of those tasks when the thread detects that task is ready to be retired.

Figure 4:
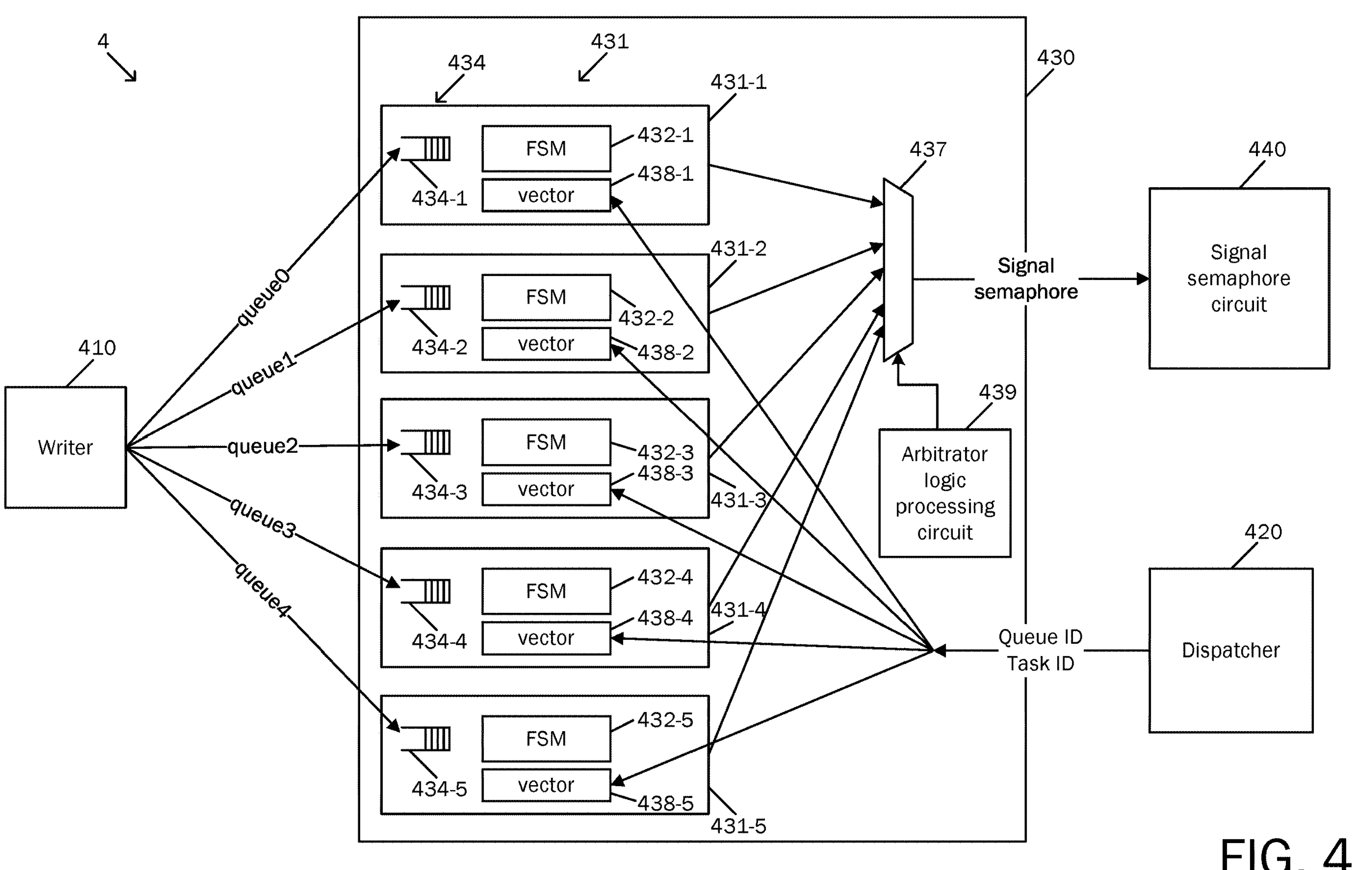
FIG. 4 is a block diagram depicting a multi-threaded retire circuit according to one example of the present technology.

FIG. 4 is a block diagram depicting a multi-threaded retire circuit according to one example of the present technology. In a similar manner to the hardware accelerator 2 shown in FIG. 2, a hardware accelerator 4 may be referred to as a Multi-hop Subcommand Controller (MSC) that includes a writer circuit 410 configured to arbitrate the input command streams received from the CPU (e.g., CPU 15 as shown in FIG. 1), a dispatcher circuit 420 (e.g., to pipeline the data movement in different on-chip memories and/or to perform computations associated with the tasks), and a multi-threaded retire circuit 430 configured to re-order the results and supply the results to a signal semaphore circuit 440 to report the completion of the tasks back to the CPU. In various examples of the present technology, the hardware accelerator 4, including the writer circuit 410, the dispatcher circuit 420, the multi-threaded retire circuit 430, and the signal semaphore circuit 440, may be implemented using, for example, a custom fabricated integrated circuit, an application specific integrated circuit (ASIC), a field programmable gate array (FPGA), or the like, or combinations thereof, such as where different functionality of the hardware accelerator 4 is implemented by integrated circuits on the same semiconductor die or on different semiconductor dies, whether in the same semiconductor package or in different semiconductor packages. In examples of the present technology implemented in an FPGA, an integrated circuit, or an ASIC, a non-transitory, computer readable medium includes computer instructions that, when executed by a processor, cause the processor to configure the FPGA (e.g., a bitfile defining connections in an internal fabric of the FPGA, values in lookup tables of the FPGA, and the like) or configure the integrated circuit or ASIC (e.g., defining low level transistor material layouts or high-level hardware description languages) to implement the various components of examples of the present technology.

In the example shown in FIG. 4, each input queue 434 of the multi-threaded retire circuit 430 is maintained or managed by a separate retire sub-circuit 431 having a processing logic circuit 432 executing a thread of the processing multi-threaded retire circuit 430. The plurality of separate retire sub-circuits 431 may be controlled by a shared clock signal. Each retire sub-circuit includes a separate processing logic circuit 432 (labeled FSM, indicating that the behavior of the processing logic circuit may be controlled using a finite state machine or FSM) that executes a separate thread that manages the retirement of tasks on its corresponding input queue 434. In addition, instead of having a single global table of ready-to-retire tasks, each retire sub-circuit includes a separate vector or local ready-to-retire table or input queue specific ready-to-retire table 438 stored in local memory associated with the processing logic circuit 432, where the local ready-to-retire table 438 is configured to track the ready-to-retire tasks for the corresponding input queue 434 and where, in some examples of the present technology, separate processing logic is used to update the local ready-to-retire table 438 based on events broadcasted by the dispatcher 420. Therefore, the separate threads are executed in parallel (e.g., at the same time), such that tasks associated with different queues can be concurrently analyzed for readiness to be retired and completed tasks can be concurrently added to corresponding ready-to-retire tables 438, thereby allowing the multi-threaded retire circuit 430 to have a higher throughput (e.g., in number of task retirements per clock cycle) compared to a single threaded approach, with a tradeoff of increased circuit complexity and/or increased area consumed in an integrated circuit.

FIG. 4 shows a particular example of the present technology with five input queues, labeled queue0 through queue4, although the present disclosure is not limited thereto and the number of input queues 434 included in the multi-threaded retire circuit 430 may be configured as appropriate for the workloads that will be managed by the hardware accelerator and as appropriate for tradeoffs between the number of queues, the maximum sizes of such queues (e.g., maximum number of tasks that can be stored in the queues), and the physical area consumed by the input queues and the retire sub-circuits 431 for processing each thread in the multi-threaded retire circuit 430.

The retire sub-circuit of the plurality of retire sub-circuits 431 of the multi-threaded retire circuit associated with queue0 is labeled as first retire sub-circuit 431-1 and similar labels are applied to the corresponding processing logic circuit 432-1, the corresponding input queue 434-1 storing input tasks for the stream of tasks associated with queue0, and the corresponding vector 438-1 tracking ready-to-retire tasks or commands from the stream of tasks associated with queue0. Similar reference numerals are applied to the second retire sub-circuit 431-2, the third retire sub-circuit 431-3, the fourth retire sub-circuit 431-4, and the fifth retire sub-circuit 431-5.

As shown in FIG. 4, the writer circuit 410 writes information regarding incoming tasks corresponding to different command streams in a manner similar to the writer circuit 210 of the example shown in FIG. 2. Each incoming task is associated with a particular stream. Each input queue is associated with a corresponding stream and the writer circuit 410 writes incoming information regarding the tasks (e.g., metadata or book-keeping information 110M) into the input queue 434 for the stream that the task is associated with. For example, Stream A may be associated with queue1, Stream B may be associated with queue2, and Stream C may be associated with queue3, in which case the writer circuit 410 would write, for example, task TAC1 to input queue1, task TBC1 to input queue2, and task TCC1 to input queue3.

The dispatcher circuit 420 broadcasts task completion events to all of the retire sub-circuits 431 of the multi-threaded retire circuit 430 when those corresponding tasks are completed. These task completion events may include a queue identifier or queue ID (or completed task queue identifier) that identifies the queue (or stream) that the task is associated with and also include a task identifier or task ID (or completed task identifier) identifying the task that was completed. Continuing the above example, Stream A, which includes tasks TAC1, TAC2, and TAC3 as shown in FIG. 1, may be associated with queue1. Task TAC2 may also be assigned a task ID such as task ID 3. (In some embodiments, while task IDs may be is assigned to tasks sequentially in the order in which the tasks arrive in the Stream, the particular task ID is not necessarily linked to any identifier (e.g., command identifier) provided from the CPU, such that Task TAC1 may have task ID 2, and Task TAC3 may have task ID 4.) When task TAC2 is completed, the dispatcher circuit 420 broadcasts a task completion event for task TAC2, which includes its task ID (task ID 3) and a corresponding queue identifier (e.g., queue1). In some examples, the dispatcher circuit 420 uses a stream identifier or stream ID (e.g., as assigned by the CPU) instead of, or in addition to, a queue identifier (e.g., as assigned by the hardware accelerator).

Figures 5A, 5B:
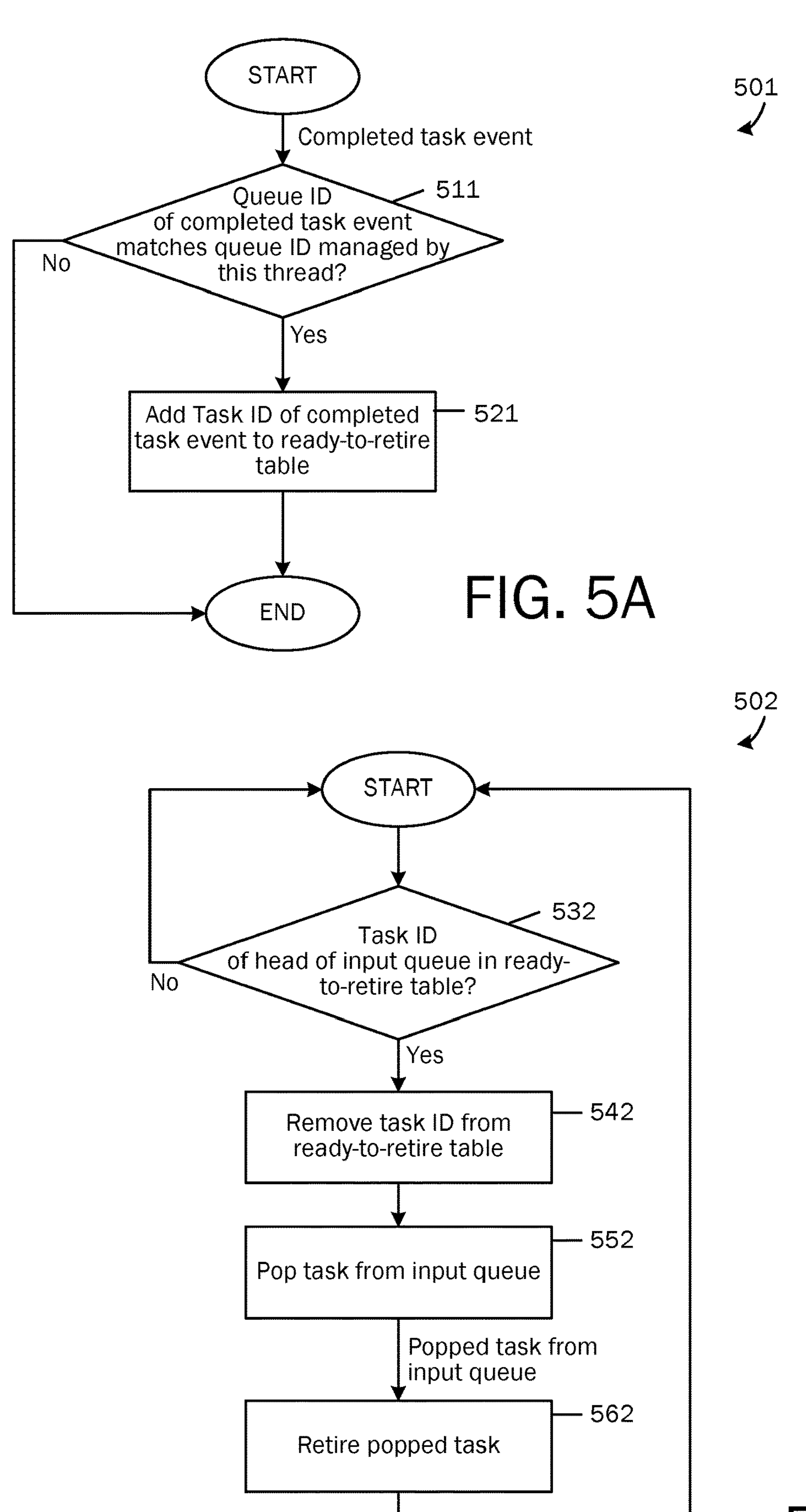
FIG. 5A is a flowchart of a method for processing incoming completed task events using a retire circuit according to one example of the present technology.
FIG. 5B is a flowchart of a method for retiring ready-to-retire tasks from an input queue using a retire circuit according to one example of the present technology.

FIG. 5A is a flowchart of a method for processing incoming completed task events using a retire circuit according to one example of the present technology. In contrast to the approach of FIG. 3, instead of being driven by incoming task completion events received from the dispatcher, incoming task completion events are automatically written to a local ready-to-retire table 438 and the processing logic circuit 432 of the retire sub-circuit 431 continuously polls the local ready-to-retire table 438 to check for a match with the task at the head of the input queue 434. In more detail, referring to method 501, when an incoming competed task event arrives as the retire sub-circuit 431, processing logic determines, at operation 511, whether the completed task queue identifier (queue ID) of the completed task event matches with the input queue ID of the input queue 434 that is managed by thread executed by the retire sub-circuit (or a stream ID of a stream associated with an input queue managed by the retire sub-circuit). In a case where the completed task queue ID of the completed task event does not match the input queue ID of the input queue being managed by the retire sub-circuit 431, then the retire sub-circuit 431 ignores the completed task event and ends processing until a next completed task event is received. In a case where the thread executed by the processing logic circuit 432 detects that the completed task queue ID of the completed task event matches the input queue ID of the input queue 434 that it is managing, then, at operation 521 a task identifier of the completed task event is recorded in the local ready-to-retire table 438 and then processing ends until a next completed task event is received.

In some examples, the ready-to-retire table 438 is implemented using a bit vector that is indexed by task ID, where a task ID is added to the ready-to-retire table 438 by setting (e.g., to a value of 1) the bit at the position of the bit vector identified by the task ID. In such examples, the number of bits in the task ID is matched to the length of the bit vector, which also constrains the depth of the input queue. For example, if the task ID is a 6-bit value, then the bit vector has a length of $2^6=64$. This also sets a maximum input queue depth of 64 to satisfy the constraint that the task ID be unique for a stream at any given time. This allows the task ID to be set using a free run counter.

In some examples, the index of the retire vector is the task ID. For some types of sequences of tasks, the tasks are always completed in order and therefore the retire logic only needs to send one signal semaphore for all of the tasks in the sequence (example of thread C as described above with respect to FIG. 1). As a specific example, a stream of adjacent data may be moved from the hardware accelerator to external memory. These adjacent data have the same source and destination, and only the last task or command in the sequence may have a semaphore bit set (e.g., where all of the preceding tasks or commands in the sequence have their semaphore bit unset). In this case, the processing logic circuit 432 detects that this sequence of tasks can be optimized by grouping the sequence of input commands, such as by detecting that the tasks are associated with a command ID that follows the pattern where the commands are known to be completed in order and where only last command has a valid semaphore bit.

FIG. 5B is a flowchart of a method 502 for retiring ready-to-retire tasks from an input queue using a retire circuit according to one example of the present technology. At operation 532, the processing logic circuit 432 of the retire sub-circuit polls the ready-to-retire table 438 to determine if the input task identifier at the head of the input queue 434 appears in the local ready-to-retire table 438 (e.g., if a ready-to-retire bit is set in an entry of the local ready-to-retire table 438 corresponding to the task identifier). If the input task identifier cannot be found in the local ready-to-retire table 438 (e.g., if the entry in the local ready-to-retire table 438 is set to a value, such as 0, that indicates that the task has not yet been completed and therefore is not yet ready to retire), then the processing logic circuit 432 returns to the Start and polls again in accordance with a polling interval. In a case where the task ID is found in the ready-to-retire table 438 (e.g., if the entry in the local ready-to-retire table 438 is set to a value, such as 1, that indicates that the task has been completed and therefore is ready to retire), then at operation 542 the processing logic circuit 432 removes the task identifier from the local ready-to-retire table 438 (e.g., by clearing the ready-to-retire bit for the corresponding entry), pops the input task from the head of the input queue 434 at operation 552, and retires the popped task at operation 562 (e.g., by outputting a task retirement event or signal semaphore). In the example shown in FIG. 4, each of the retire sub-circuits 431 generates outputs that are supplied to a multiplexer 437 controlled by an arbitrator circuit 439, which arbitrates write access to the signal semaphore circuit 440 between the retire sub-circuits 431, as will be described in more detail below. After retiring the popped task, the processing logic circuit 432 returns to the Start to continue polling, e.g., in accordance with the polling interval (e.g., waiting for some number of clock cycles based on the polling interval).

As noted above, when a retire sub-circuit 431 retires a task, it supplies its output (e.g., information regarding the retirement of a task) to a multiplexer 437, where an arbitrator circuit 439 manages potential contention between the multiple retirement threads running concurrently in the multi-threaded retire circuit 430. In a simple case where there is no contention for access to the signal semaphore circuit 440—e.g., when only one retire sub-circuit 431 is attempting to output to the signal semaphore circuit 440—then the multiplexer 437, controlled by the arbitrator circuit 439, may automatically forward signal semaphores to the signal semaphore circuit 440 to be reported back to the CPU.

However, in some cases there may be contention for access to the signal semaphore circuit 440, such as where multiple retire sub-circuits 431 are simultaneously retiring tasks (e.g., generating output signals). In these cases, the arbitrator circuit 439 controls access to the signal semaphore circuit, e.g., serializing the task retirement events received in parallel from multiple retire sub-circuits 431, such that the signal semaphore circuit 440 receives a serialized sequence of task retirement events from the multi-threaded retire circuit 430. In various examples of the present technology, the arbitrator circuit 439 determines which task retirement event to select next from among multiple waiting task retirement events using a variety of techniques such as: round robin access (e.g., each retire sub-circuit takes turns); fairness-based access (e.g., tracking frequency of access and attempting to distribute access evenly between the different threads, such as selecting the sub-circuit that has been selected the fewest number of times); and the like.

Accordingly, aspects of the present technology relate to a multi-threaded retire circuit in which multiple threads of the retire circuit operate in parallel to detect whether the task at the head of each input queue can be retired and to handle the retiring of those tasks, such as generating signal semaphores or task retirement events, when the thread detects that task is ready to be retired.

Figure 6:
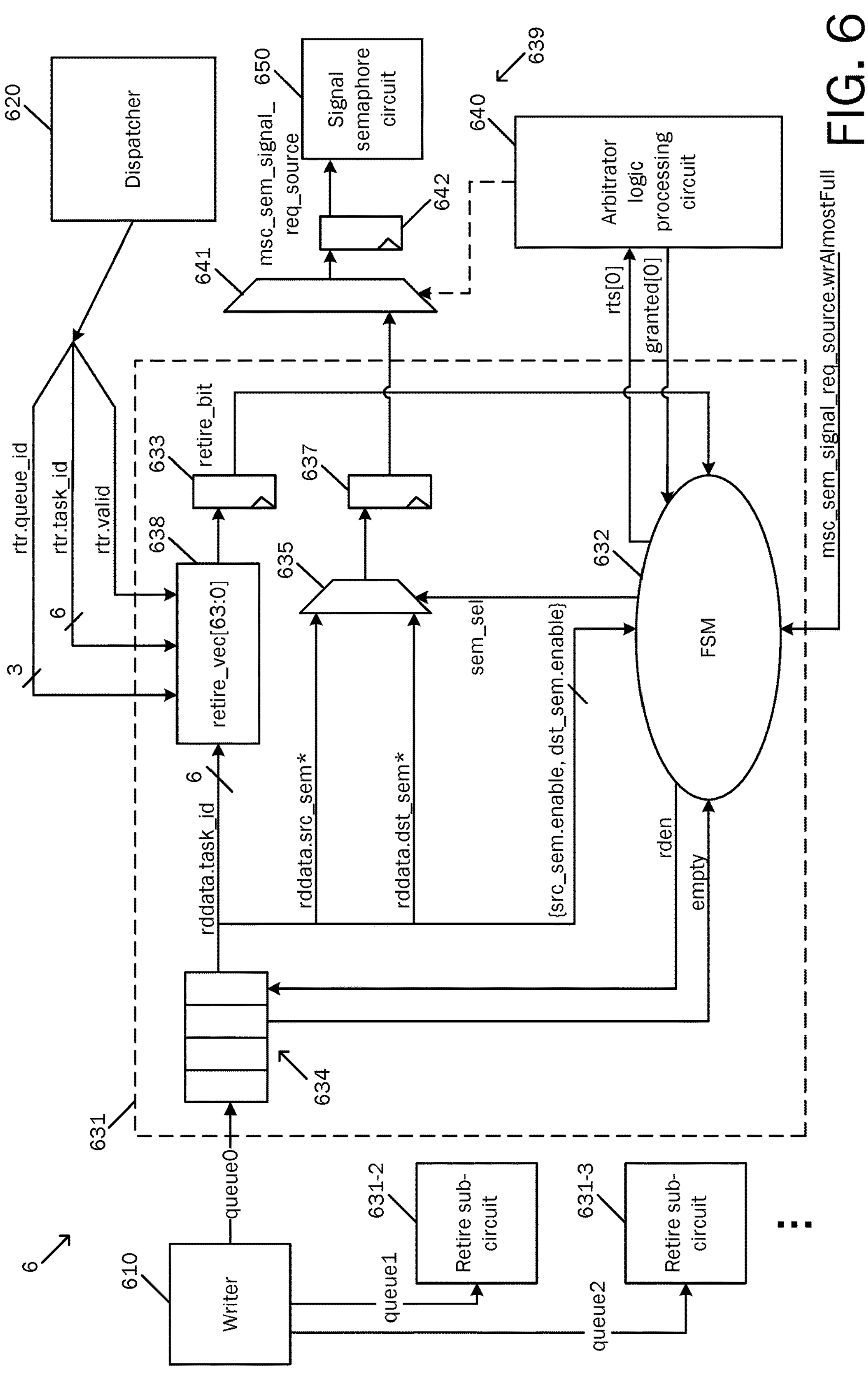
FIG. 6 is a block diagram depicting one thread of a multi-threaded retire circuit configured to retire tasks associated with one stream of tasks according to one example of the present technology.

FIG. 6 is a block diagram depicting one thread of a multi-threaded retire circuit configured to retire tasks associated with one stream of tasks according to one example of the present technology. In a similar manner to the hardware accelerator 4 shown in FIG. 4, a hardware accelerator 6 may be referred to as a Multi-hop Subcommand Controller (MSC) that includes a writer circuit 610 configured to arbitrate the input command streams received from the CPU (e.g., CPU 15 as shown in FIG. 1), a dispatcher circuit 620 (e.g., to pipeline the data movement in different on-chip memories and/or to perform computations associated with the tasks), and a multi-threaded retire circuit configured to re-order the results and supply the results to a signal semaphore circuit 440 to report the completion of the tasks back to the CPU.

In the example of FIG. 6, only one retire sub-circuit 631 of the multi-threaded retire circuit is explicitly shown, where the one depicted retire sub-circuit 631 is associated with an input queue (queue0). The multi-threaded retire circuit of the hardware accelerator 6 further includes at least one additional retire sub-circuit substantially similar to the retire sub-circuit 631 shown in FIG. 6, but each of these additional retire sub-circuits is associated with a different input queue (e.g., retire sub-circuit 631-2 associated with queue1, retire sub-circuit 631-3 associated with queue2, etc.).

In various examples of the present technology, the hardware accelerator 6, including the writer circuit 610, the dispatcher circuit 620, the multi-threaded retire circuit including the retire sub-circuit 631, arbitrator circuit 639, and the signal semaphore circuit 650, may be implemented using a custom fabricated integrated circuit, an application specific integrated circuit (ASIC), a field programmable gate array (FPGA), or the like, or combinations thereof, such as where different functionality of the hardware accelerator 6 is implemented by integrated circuits on the same semiconductor die or on different semiconductor dies, whether in the same semiconductor package or in different semiconductor packages. In examples of the present technology implemented in an FPGA, an integrated circuit, or an ASIC, a non-transitory, computer readable medium includes computer instructions that, when executed by a processor, cause the processor to configure the FPGA (e.g., a bitfile defining connections in an internal fabric of the FPGA, values in lookup tables of the FPGA, and the like) or configure the integrated circuit or ASIC (e.g., defining low level transistor material layouts or high-level hardware description languages) to implement the various components of examples of the present technology.

Figure 7:
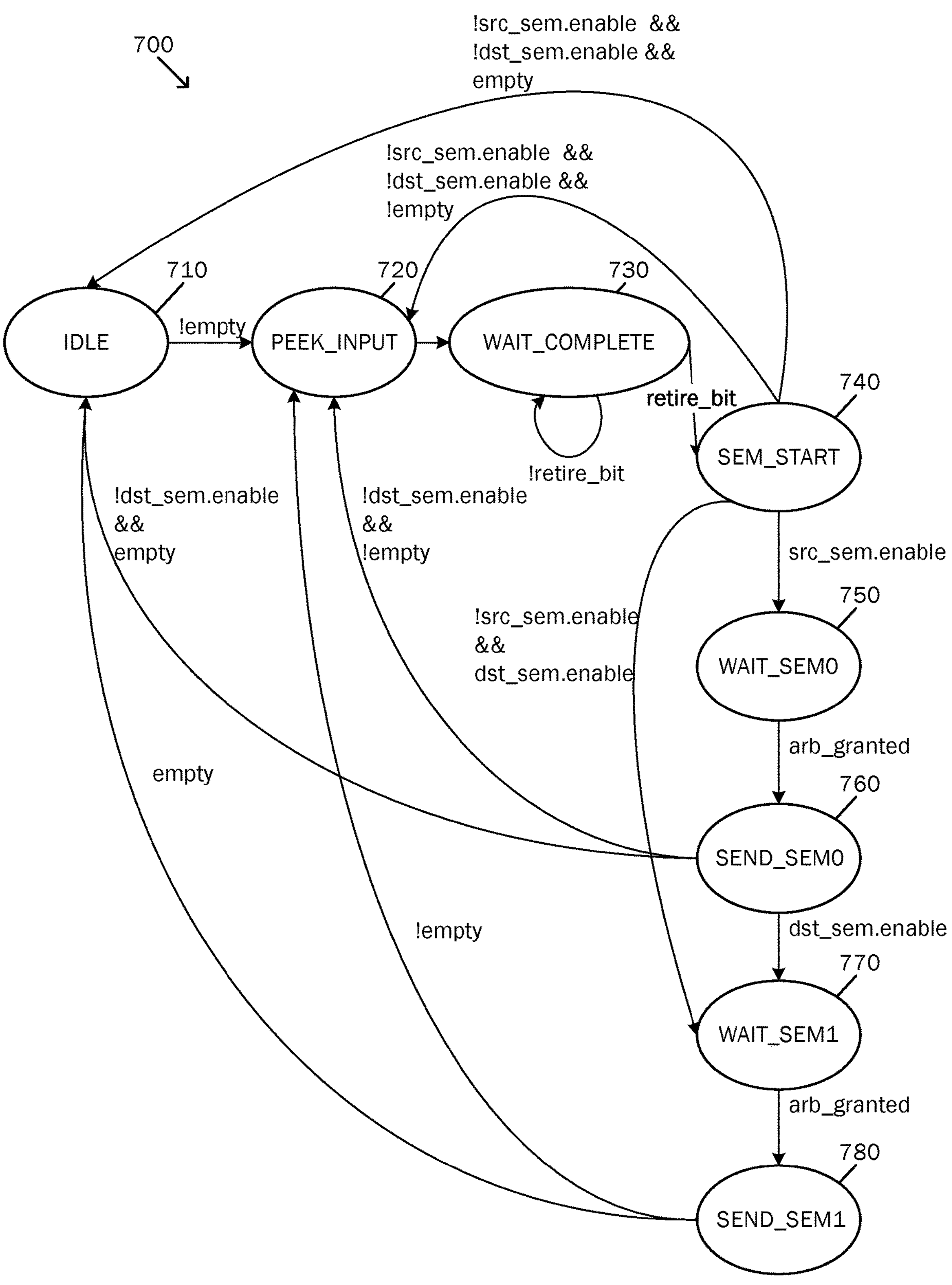
FIG. 7 is a state transition diagram for a finite state machine for controlling one thread of a multi-threaded retire circuit to retire tasks associated with one stream of tasks according to one example of the present technology.

In a similar manner to the hardware accelerator 4 described above with respect to FIG. 4, the retire sub-circuit 631 executes a thread in processing logic circuit 632. In some examples, the thread is controlled using a finite state machine (FSM). FIG. 7 is a state transition diagram 700 for a finite state machine for controlling one thread of a multi-threaded retire circuit to retire tasks associated with one stream of tasks according to one example of the present technology. As shown in FIG. 7, the FSM starts in an idle state 710 (IDLE), when the input queue is empty, as determined by an "input queue is empty" signal (empty) from the input queue 634 to the processing logic circuit 632.

The writer circuit 610 adds metadata or book-keeping information regarding tasks to the input queue 634 that is associated with the stream that is managed by the retire sub-circuit 631 (e.g., queue0 in the example of FIG. 6). New tasks are added to the tail of the input queue 634, and the earliest inserted task is at the head of the input queue 634. As such, when a new task is added to the input queue 634, the input-queue-is-empty signal goes low, and the FSM follows a transition to a peek input state 720 (PEEK INPUT). In some examples of the present technology, instead of peeking at the value of the task at the head of the input queue 634, the task at the head of the input queue 634 is popped (removed from the memory location where the input queue 634 is stored) and stored in a register representing the current head of the input queue 634. In various examples of the present technology, the hardware implementation may take either of the above approaches and is not limited to these particular approaches.

The dispatcher circuit 620 broadcasts task completion events to all retire sub-circuits 631, where each of the task completion events includes a completed task queue identifier (queue id) and a completed task identifier (task_id). The dispatcher circuit 620 may also provide an output valid signal (rtr.valid) indicating whether or not the signals presented as the completed task queue identifier and the completed task identifier are valid. The thread executed by the retire sub-circuit 631 sets a retire vector bit in the local ready-to-retire table 638, as indexed by completed task identifier (task_id) when the queue identifier in the broadcasted task completion event matches the queue identifier associated with the thread executed by the retire sub-circuit 631. In the example shown in FIG. 6, the task identifier (task_id) is six bits and therefore, the retire vector or ready-to-retire table 638 is $2^6$=64 bits long. A queue identifier is shown in FIG. 6 as being 3 bits long, such that the multi-threaded retire circuit can support up to 23=8 parallel streams in parallel (as noted above, the number of streams can be increased by adding additional separate retire sub-circuits 431, each being configured to retire tasks originating from a different CPU thread or stream or sequence of commands.

In the peek input state 720, the processing logic circuit 632 supplies a read enable signal (rden) to control the input queue 634 to output the task identifier (rddata.task_id) to the local ready-to-retire table 638, which looks up the value associated with that task identifier, where the value is stored in a register 633 and where the value is output to the processing logic circuit 632 as a signal identifying a determination of a match in the local ready-to-retire table 638 (retire_bit). If the retire_bit signal is not set, then the FSM loops in the wait complete state 730 (WAIT_COMPLETE), polling the local ready-to-retire table 638 until it is updated to indicate that the task corresponding to the current task identifier at the head of the input queue 634 has completed.

When the retire bit for the task ID in the local ready-to-retire table 638 is set, then the outstanding task has completed, and the FSM transitions to the semaphore start state 740 (SEM_START). it sets the ready to send a semaphore signal to arbitration logic. In the example shown in FIG. 6 and FIG. 7, the retire sub-circuit may generate a source ready semaphore signal (src_sem) to indicate that data at a source location is ready to be accessed or read and/or a destination valid semaphore signal (dst_sem) to indicate that the data located at a destination address is ready to be accessed. As shown in FIG. 6, the metadata associated with a task, as stored in the input queue 634, provides a destination valid semaphore enable signal (dst_sem.enable) and a source ready semaphore enable signal (src_sem.enable) to the FSM running in the processing logic circuit 632. As shown in FIG. 7, when destination valid semaphore enable signal is high and the source ready semaphore enable signal is low, then the FSM transitions to a state to wait to send destination valid semaphore 770 (WAIT_SEM1). In a case where the source ready semaphore signal is high, then the FSM transitions to a state to wait to send the source ready semaphore 750 (WAIT_SEM0).

When entering a state to wait to send a semaphore (e.g., WAIT_SEM0 750 or WAIT_SEM1 770), the retire sub-circuit 631 sends an arbitrator circuit 639 a request to transmit a semaphore (rts). As discussed above, the arbitrator circuit 639 may use an arbitration policy implemented in an arbitrator logic processing circuit 640 to determine how to grant access to the semaphore signal circuit when there is contention for access (e.g., based on a round robin arbitration policy, a fairness-based arbitration policy, or the like). The arbitrator circuit 639 provides an arbitration grant signal (arb_granted) to the retire sub-circuit 631. When the arbitration grant signal is received, FSM proceeds to a following send state.

For example, when the FSM is in the state to wait to send the source ready semaphore 750 (WAIT_SEM0) and receives an arbitration grant signal, it transitions to a send source ready semaphore state 760 (SEND_SEM0) at which point it sends the semaphore. In more detail, because a task may include one or both of a source ready semaphore (rddata.src_sem*) and a destination valid semaphore (rddata.dst_sem*), these signals are supplied to a semaphore multiplexer 635 and the FSM controls the semaphore multiplexer using a semaphore select signal sem_sel based on the current state (e.g., whether it is in the send source ready semaphore state 760 SEND_SEM0 or the send destination valid semaphore state 780 SEND_SEM1). The value is stored in a local semaphore register 637 to be output to an arbitrator multiplexer 641 of the arbitrator circuit 639. In some embodiments, the arbitrator logic processing circuit supplies a signal to the arbitrator multiplexer 641 to select an appropriate input of the arbitrator multiplexer 641 based on which retire sub-circuit 631 has been granted access to the signal semaphore circuit. In other examples, the arbitrator multiplexer 641 may be a shared output node, where access to the shared output node is controlled based on the timing (e.g., such that only one retire sub-circuit 631 outputs values into the node). The value output by the arbitrator multiplexer 641 is stored in a register 642, which then provides the signal (msc_sem_signal_req_source) to the signal semaphore circuit 650 which reports the task retirement events to the CPU.

After the sending the source ready signal semaphore, the FSM detects whether the destination valid semaphore enable signal (dst_sem.enable) is also set (e.g., as programmed by the software using the hardware accelerator). If so, then it proceeds to the state to wait to send destination valid semaphore 770 (WAIT_SEM1). If not, and the input queue 634 is empty, the FSM proceeds back to the idle state 710. If the input queue 634 is not empty, the FSM proceeds back to the peek input state 720.

Similarly, after sending the destination ready signal semaphore in state 780, the FSM transitions to the idle state 710 if the input queue 634 is empty and transitions to the peek input state 720 if the input queue 634 is not empty.

In addition, in some examples of the present technology, a semaphore not ready signal (msc_sem_signal_req_source-.wrAlmostFull) is provided to the logic processing circuit 632 to indicate that the signal semaphore circuit 650 is not ready to receive any retirement event, so the logic processing circuit 632 does not transmit retirement events to signal semaphore circuit 650 until the semaphore not ready signal is cleared, even if the arbitrator logic processing circuit 640 grants access to the signal semaphore circuit 650.

Before transitioning back to the idle state 710 or the peek input state 720, after winning the arbitration and successfully sending the signal semaphore to outside logic (e.g., the signal semaphore circuit), the FSM clears the task ID bit in the local ready-to-retire table 638 and pops the input queue to remove the task at the head of the queue. In some circumstances, both the dispatcher circuit 620 and the FSM running in the processing logic circuit 632 will concurrently update the local ready-to-retire table 638, but this does not cause a race condition because the uniqueness of the task identifiers, as controlled by the writer circuit 610, ensures that the dispatcher circuit 620 and the FSM running in the processing logic circuit 632 will be updating different task identifiers. For example, the writer circuit 610 is configured to stop generating new task identifiers if the input queue 634 is full and the running task identifier has wrapped around based on the depth of the input queue 634. In this way, there is no need to apply back pressure to the dispatcher circuit 620.

Accordingly, aspects of the present technology provide systems and methods for multi-threaded retirement of tasks in a hardware accelerator. In some implementations, a multi-thread retiring architecture introduces a relatively small hardware cost compared with the single-thread version. For example, one example implementation of a single threaded retire circuit on a field programmable gate array used 1536 adaptive logic modules (ALMs) while an implementation of a multi-thread retire circuit with 5 threads used 1702 ALMs. The 10.8% increase on the hardware cost resulted in a 70% performance boost, as measured by the number of clock cycles, on a same test workload of multiple streams of tasks.

Some aspects of the present technology relate to splitting a state machine for performing retirement of tasks into multiple threads, taking advantage of the software execution model in which tasks from the same stream (e.g., a single CPU thread) must be retired in the same order as they are supplied, but tasks from different streams (e.g., different CPU threads) can be interleaved in any order. Some aspects of the present technology relate to simplifying the state machine logic such that it only pops the input queue and clears a corresponding bit in its local ready-to-retire table or ready-to-retire vector and allows the logic for setting the ready-to-retire bit to be implemented separately. The multiple retire sub-circuits share an interface with a signal semaphore circuit using an arbitrator, thereby saving space that might otherwise be used by implementing multiple interfaces. Some aspects further relate to grouping together input commands that are guaranteed to be completed in-order with a single task identifier, thereby reducing memory usage. In addition, the number of unique task identifiers is set to be the same as the depth of the input queues, thereby allowing the hardware to set and clear ready-to-retire table bits at the same time, which also relaxes back pressure for out of order completion.

Figure 8:
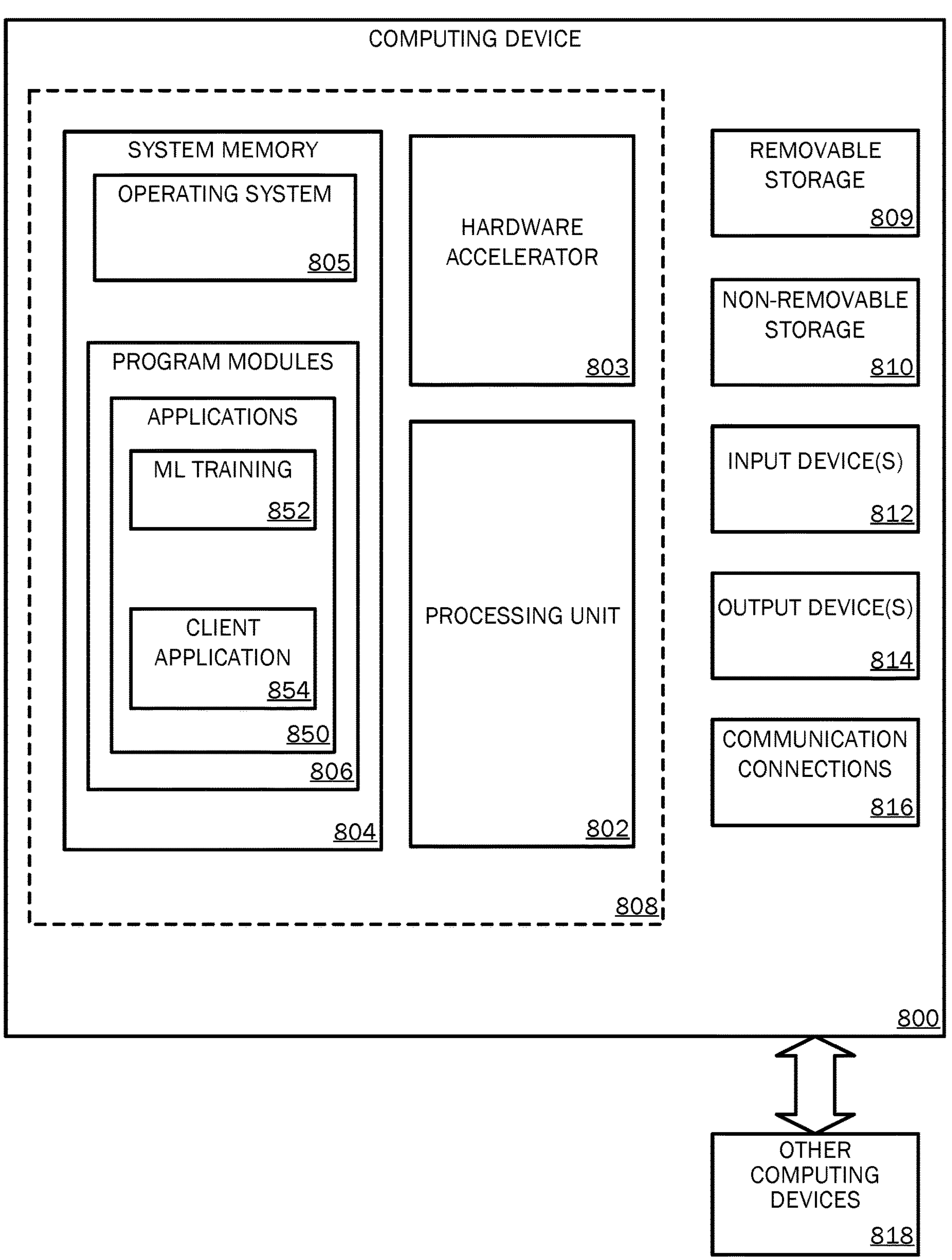
FIG. 8 is a block diagram illustrating example physical components of a computing device with which aspects of the invention may be practiced.
Figure 9A:
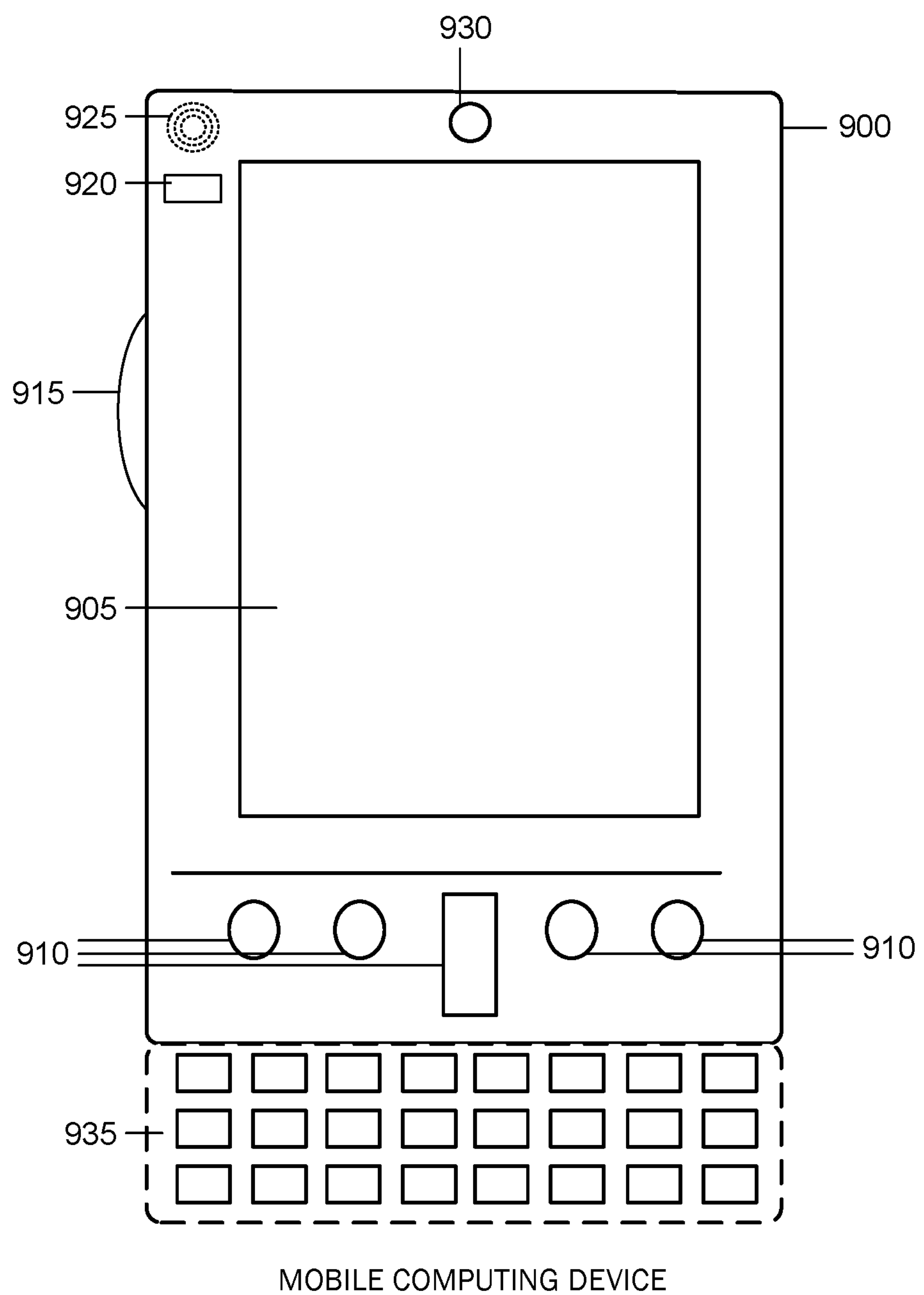
FIGS. 9A and 9B are simplified block diagrams of a mobile computing device with which aspects of the present invention may be practiced.
Figure 9B:
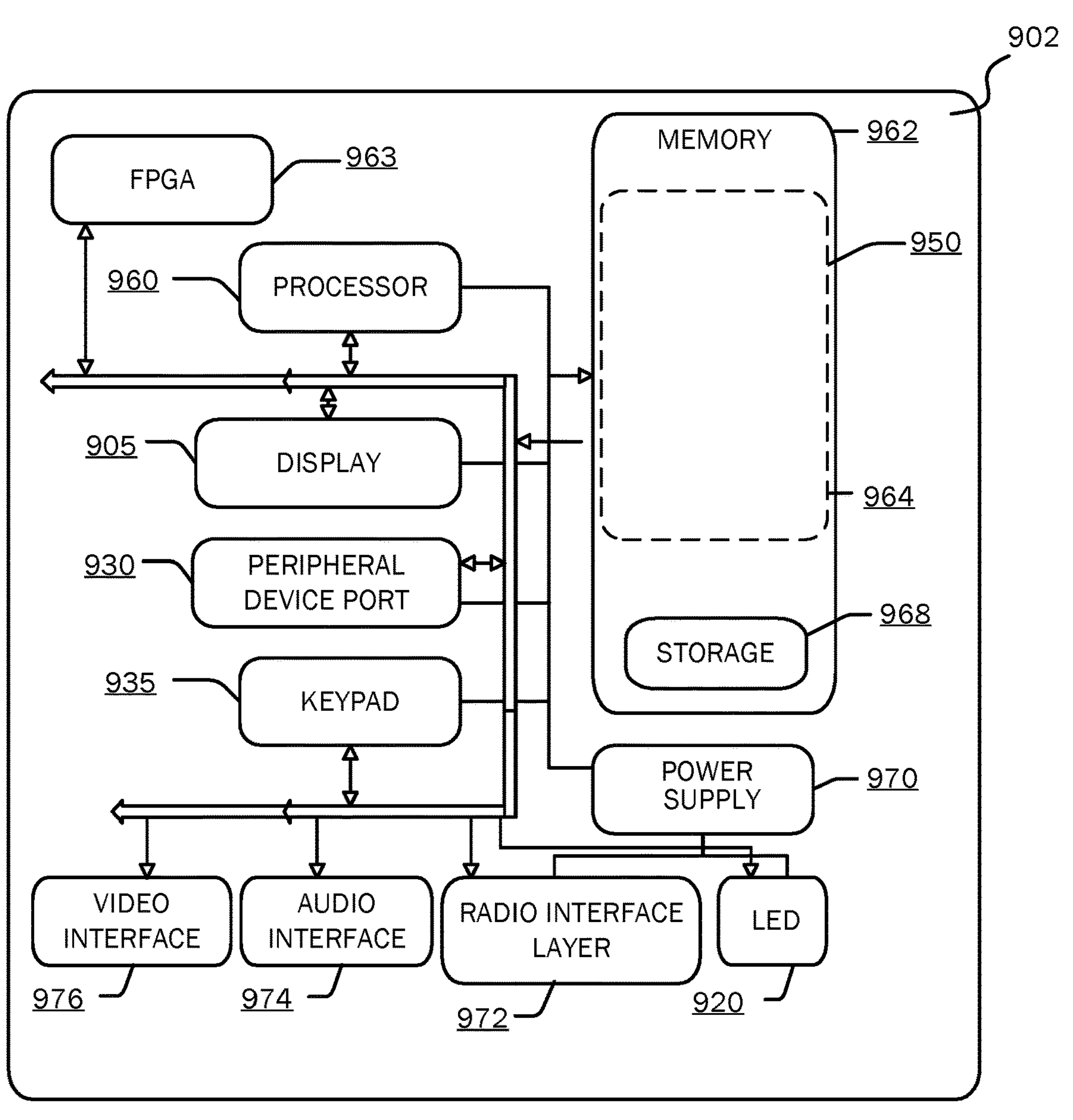

FIGS. 8, 9A, and 9B the associated descriptions provide a discussion of a variety of operating environments in which examples of the present technology may be practiced. However, the devices and systems illustrated and discussed with respect to FIGS. 8, 9A, and 9B are for purposes of example and illustration and are not limiting of a vast number of computing device configurations that may be utilized for practicing aspects of the invention, described herein.

FIG. 8 is a block diagram illustrating physical components (i.e., hardware) of a computing device 800 with which examples of the present disclosure may be practiced. The computing device components described below may be suitable for running a training process for a machine learning model or for performing inference using a trained machine learning model, as described above. In a basic configuration, the computing device 800 may include at least one processing unit 802, a hardware accelerator 803, and a system memory 804. In some examples, the processing unit 802 includes an FPGA (e.g., the processing unit 802 may include an array of logic blocks that are reconfigurable through setting the interconnections). In some examples, the processing unit 802 is integrated or embedded into the FPGA (e.g., in the case where one or more embedded "hard IP" CPU cores are connected directly to the interconnections or fabric of the FPGA 803 and/or one or more embedded "soft IP" CPU cores implemented using logic blocks of the FPGA 803). In some examples, the hardware accelerator 803 includes an FPGA. In some examples, the hardware accelerator 803 includes a hardware retire circuit in accordance with aspects of the present technology. Depending on the configuration and type of computing device, the system memory 804 may include, but is not limited to, volatile storage (e.g., random access memory), non-volatile storage (e.g., read-only memory), flash memory, or any combination of such memories. The system memory 804 may include an operating system 805 and one or more program modules 806 suitable for running software applications 850 such as a machine learning model training application 852 or a client application 854. The operating system 805, for example, may be suitable for controlling the operation of the computing device 800. Furthermore, aspects of the invention may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 may perform processes that offload computational tasks to the hardware accelerator 803. The hardware accelerator 803 may include data paths configured to accelerate various computing tasks, such as mathematical functions relating to machine learning tasks, data movement tasks, and the like, and may control or sequence signaling of task retirement (e.g., signaling the completion of tasks) to the processing unit 802 or another processor in accordance with FIGS. 1, 2, 3, 4, 5A, 5B, 6, and 7.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 8 may be integrated onto a single integrated circuit. Such an SOC device may include one or more processing units, field programmable gate arrays, graphics units, communications units, system virtualization units and various application functionality all of which are integrated (or "burned") onto the chip substrate as a single integrated circuit. When operating via an SOC, some functionality, described herein, with respect to training a machine learning model (e.g., a deep neural network) or performing a calculation involving the masking of data, may be operated via application-specific logic integrated with other components of the computing device 800 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 800 may also have one or more input device(s) 812 such as a keyboard, a mouse, a pen, a sound input device, a touch input device, etc. The output device(s) 814 such as a display, speakers, a printer, etc. may also be included. The aforementioned devices are examples and others may be used. In cases where the computing device 800 is a server, such user input devices and user output devices are typically not present or not directly connected to the computing device 800. The computing device 800 may include one or more communication connections 816 allowing communications with other computing devices 818. Examples of suitable communication connections 816 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, program modules, or configuration files ("bit files") specifying the configuration of an FPGA to implement particular functionality. The system memory 804, the removable storage device 809, and the non-removable storage device 810 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects of the invention may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative examples, mobile computing device 900 may incorporate more or less input elements. For example, the display 905 may not be a touch screen in some examples. In alternative examples, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 can incorporate a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone. As shown in FIG. 9B, the system 902 further includes a processor 960, a memory 962 storing an operating system 964 that may be executed by the processor 960. The system 902 may further include a hardware accelerator 963, which may be configured to accelerate various computing tasks and which includes a hardware retire circuit as described above according to various examples of the present disclosure.

One or more application programs 950 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, machine learning software (e.g., for retraining models and/or federated machine learning) and so forth. The system 902 also includes a non-volatile storage area 968 within the memory 962. The non-volatile storage area 968 may be used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

The visual indicator 920 may be used to provide visual notifications and/or an audio interface 974 may be used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

As will be understood from the foregoing disclosure, one aspect of the technology relates to a hardware retire circuit including: one or more input queues, each queue corresponding to an input stream of tasks and being configured to store input task identifiers corresponding to tasks of the input stream; and processing logic configured to: receive a completed task event; determine whether a completed task queue identifier and a completed task identifier of the completed task event match an input task identifier of an input task at a head of an input queue having an input queue identifier corresponding to the completed task queue identifier; and in response to determining a match, pop the task at the head of the input queue and output a task retirement event corresponding to the input task.

The hardware retire circuit may further include a memory storing a ready-to-retire table storing a plurality of entries corresponding to completed task events previously received by the hardware retire circuit, wherein the processing logic is further configured to, after popping the task at the head of the input queue: determine whether a second input task identifier of a second input task at an updated head of the input queue and the input queue identifier match an entry in the ready-to-retire table; and in response to determining a match: pop the task at the updated head of the input queue; remove the second input task from the ready-to-retire table; and output a second task retirement event corresponding to the second input task.

The processing logic may include a plurality of retire sub-circuits corresponding to one of the one or more input queues, wherein a retire sub-circuit of the plurality of retire sub-circuits includes: a local ready-to-retire table of a memory of the retire sub-circuit; and a processing logic circuit configured to manage the input queue associated with the retire sub-circuit. The local ready-to-retire table may be configured to: compare the completed task queue identifier with the input queue identifier of the input queue associated with the retire sub-circuit; and update the local ready-to-retire table to indicate that the task associated with the completed task event is ready to be retired, and the processing logic circuit may be configured to: determine whether the completed task queue identifier and the completed task identifier match the input task identifier by determining whether the input task identifier of the input queue associated with the retire sub-circuit matches the completed task identifier in the local ready-to-retire table; and in response to determining a match, pop the task at the head of the input queue associated with the retire sub-circuit and output the task retirement event corresponding to the input task.

The hardware retire circuit may further include: an arbitrator circuit configured to selectively grant the plurality of retire sub-circuits access to output the task retirement event to a signal semaphore circuit shared by the plurality of retire sub-circuits.

The hardware retire circuit may further include: a completed task queue configured to store a plurality of completed task events including the completed task event, wherein the processing logic is configured to determine whether the completed task queue identifier and the completed task identifier match the input task identifier of an input task by: comparing the input task identifier of the input task at the head of the input queue associated with the completed task queue identifier with the completed task identifier, and wherein the processing logic is further configured to, in response to determining a match, pop the completed task event from the completed task queue. The processing logic may be further configured to, in response to determining a mismatch: pop the completed task event from the completed task queue; and update a global ready-to-retire table stored in a memory of the hardware retire circuit to indicate that the task associated with the completed task event is ready to be retired, the global ready-to-retire table storing a plurality of entries corresponding to completed task events previously received by the hardware retire circuit.

Another aspect of the technology relates to a method for retiring tasks performed by a hardware accelerator, the method including: receiving a completed task event by a processing circuit of a hardware retire circuit including one or more input queues, each queue corresponding to an input stream of tasks and being configured to store input task identifiers corresponding to tasks of the input stream; determining, by the processing circuit, whether a completed task queue identifier and a completed task identifier of the completed task event match an input task identifier of an input task at a head of an input queue having an input queue identifier corresponding to the completed task queue identifier; and in response to determining a match, popping the task at the head of the input queue and output a task retirement event corresponding to the input task.

The method may further include: in response to determining a mismatch, updating a ready-to-retire table stored in a memory of the hardware retire circuit to indicate that the task associated with the completed task event is ready to be retired; and after popping the task at the head of the input queue: determining whether a second input task identifier of a second input task at an updated head of the input queue and the input queue identifier match an entry in the ready-to-retire table; and in response to determining a match: popping the task at the updated head of the input queue; removing the second input task from the ready-to-retire table; and outputting a second task retirement event corresponding to the second input task.

The processing circuit may include a plurality of retire sub-circuits corresponding to one of the one or more input queues, wherein a retire sub-circuit of the plurality of retire sub-circuits includes: a local ready-to-retire table of a memory of the retire sub-circuit; and a processing logic circuit configured to manage the input queue associated with the retire sub-circuit. The method may further include: comparing, by the local ready-to-retire table, the completed task queue identifier with the input queue identifier of the input queue associated with the retire sub-circuit; updating the local ready-to-retire table to indicate that the task associated with the completed task event is ready to be retired; determining, by the processing logic circuit, whether the completed task queue identifier and the completed task identifier match the input task identifier by determining whether the input task identifier of the input queue associated with the retire sub-circuit matches the completed task identifier in the local ready-to-retire table; and in response to determining a match, popping, by the processing logic circuit, the task at the head of the input queue associated with the retire sub-circuit and output the task retirement event corresponding to the input task.

The method may further include: selectively granting, by an arbitrator circuit, the plurality of retire sub-circuits access to output the task retirement event to a signal semaphore circuit shared by the plurality of retire sub-circuits.

The method may further include: determining whether the completed task queue identifier and the completed task identifier match the input task identifier of an input task by comparing the input task identifier of the input task at the head of the input queue associated with the completed task queue identifier with the completed task identifier; and in response to determining a match, popping the completed task event from a completed task queue stored in a memory of the hardware retire circuit configured to store a plurality of completed task events including the completed task event. The method may further include, in response to determining a mismatch: popping the completed task event from the completed task queue; and updating a global ready-to-retire table stored in a memory of the hardware retire circuit to indicate that the task associated with the completed task event is ready to be retired.

Another aspect of the technology relates to a non-transitory, computer readable medium storing instructions that, when executed, cause a processor to configure a hardware retire circuit including: one or more input queues, each queue corresponding to an input stream of tasks and being configured to store input task identifiers corresponding to tasks of the input stream; and processing logic configured to: receive a completed task event; determine whether a completed task queue identifier and a completed task identifier of the completed task event match an input task identifier of an input task at a head of an input queue having an input queue identifier corresponding to the completed task queue identifier; and in response to determining a match, pop the task at the head of the input queue and output a task retirement event corresponding to the input task.

The hardware retire circuit specified in instructions stored on the non-transitory, computer readable medium may further include a memory storing a ready-to-retire table storing a plurality of entries corresponding to completed task events previously received by the hardware retire circuit, and wherein the processing logic may be further configured to, after popping the task at the head of the input queue: determine whether a second input task identifier of a second input task at an updated head of the input queue and the input queue identifier match an entry in the ready-to-retire table; and in response to determining a match: pop the task at the updated head of the input queue; remove the second input task from the ready-to-retire table; and output a second task retirement event corresponding to the second input task.

The processing logic specified in instructions stored on the non-transitory, computer readable medium may include a plurality of retire sub-circuits corresponding to one of the one or more input queues, wherein a retire sub-circuit of the plurality of retire sub-circuits may include: a local ready-to-retire table of a memory of the retire sub-circuit; and a processing logic circuit configured to manage the input queue associated with the retire sub-circuit.

The local ready-to-retire table may be configured to: compare the completed task queue identifier with the input queue identifier of the input queue associated with the retire sub-circuit; and update the local ready-to-retire table to indicate that the task associated with the completed task event is ready to be retired, and wherein the processing logic circuit is configured to: determine whether the completed task queue identifier and the completed task identifier match the input task identifier by determining whether the input task identifier of the input queue associated with the retire sub-circuit matches the completed task identifier in the local ready-to-retire table; and in response to determining a match, pop the task at the head of the input queue associated with the retire sub-circuit and output the task retirement event corresponding to the input task.

The hardware retire circuit specified by the instructions stored on the non-transitory, computer readable medium may further include: an arbitrator circuit configured to selectively grant the plurality of retire sub-circuits access to output the task retirement event to a signal semaphore circuit shared by the plurality of retire sub-circuits.

The hardware retire circuit specified by the instructions stored on the non-transitory, computer readable medium may further include: a completed task queue configured to store a plurality of completed task events including the completed task event, wherein the processing logic may be configured to determine whether the completed task queue identifier and the completed task identifier match the input task identifier of an input task by: comparing the input task identifier of the input task at the head of the input queue associated with the completed task queue identifier with the completed task identifier, wherein the processing logic is further configured to, in response to determining a match, pop the completed task event from the completed task queue, and wherein the processing logic is further configured to, in response to determining a mismatch: pop the completed task event from the completed task queue; and update a global ready-to-retire table stored in a memory of the hardware retire circuit to indicate that the task associated with the completed task event is ready to be retired.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way.

The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A hardware retire circuit for retiring tasks using input queues and a ready-to-retire queue, the hardware retire circuit comprising:
- a plurality of input queues, each input queue corresponding to an input stream of tasks and being configured to store input task identifiers corresponding to tasks of the input stream, wherein each input queue of the plurality of input queues is associated with a corresponding input queue identifier; and
- processing logic configured to:
  - receive a completed task event having a completed task queue identifier and a completed task identifier;
  - identify an input queue from among the plurality of input queues having an input queue identifier corresponding to the completed task queue identifier;
  - write the completed task event into the ready-to-retire queue;
  - in response to popping the completed task event from the ready-to-retire queue, determine whether the completed task identifier of the completed task event matches an input task identifier of an input task at a head of the input queue having the input queue identifier corresponding to the completed task queue identifier;
  - in response to determining a match, pop the task at the head of the input queue; and
  - output a task retirement event corresponding to the input task based on the determination.

2. The hardware retire circuit of claim 1, further comprising a memory storing a ready-to-retire table storing a plurality of entries corresponding to completed task events previously received by the hardware retire circuit,
- wherein the processing logic is further configured to, after popping the task at the head of the input queue:
  - determine whether a second input task identifier of a second input task at an updated head of the input queue and the input queue identifier match an entry in the ready-to-retire table; and
  - in response to determining a match:
    - pop the task at the updated head of the input queue;
    - remove the second input task from the ready-to-retire table; and
    - output a second task retirement event corresponding to the second input task.

3. The hardware retire circuit of claim 1, wherein the processing logic comprises a plurality of retire sub-circuits corresponding to one of the plurality of input queues, wherein a retire sub-circuit of the plurality of retire sub-circuits comprises:
- a local ready-to-retire table of a memory of the retire sub-circuit; and
- a processing logic circuit configured to manage the input queue associated with the retire sub-circuit.

4. The hardware retire circuit of claim 3, wherein the local ready-to-retire table is configured to:
- compare the completed task queue identifier with the input queue identifier of the input queue associated with the retire sub-circuit; and
- update the local ready-to-retire table to indicate that the task associated with the completed task event is ready to be retired, and wherein the processing logic circuit is configured to:

determine whether the completed task queue identifier and the completed task identifier match the input task identifier by determining whether the input task identifier of the input queue associated with the retire sub-circuit matches the completed task identifier in the local ready-to-retire table; and in response to determining a match, pop the task at the head of the input queue associated with the retire sub-circuit and output the task retirement event corresponding to the input task.

5. The hardware retire circuit of claim 3, further comprising:

an arbitrator circuit configured to selectively grant the plurality of retire sub-circuits access to output the task retirement event to a signal semaphore circuit shared by the plurality of retire sub-circuits.

6. The hardware retire circuit of claim 1, further comprising:

a completed task queue configured to store a plurality of completed task events comprising the completed task event, wherein the processing logic is configured to determine whether the completed task queue identifier and the completed task identifier match the input task identifier of an input task by:

comparing the input task identifier of the input task at the head of the input queue associated with the completed task queue identifier with the completed task identifier, and wherein the processing logic is further configured to, in response to determining a match, pop the completed task event from the completed task queue.

7. The hardware retire circuit of claim 6, wherein the processing logic is further configured to, in response to determining a mismatch:

pop the completed task event from the completed task queue; and update a global ready-to-retire table stored in a memory of the hardware retire circuit to indicate that the task associated with the completed task event is ready to be retired, the global ready-to-retire table storing a plurality of entries corresponding to completed task events previously received by the hardware retire circuit.

8. A method for retiring tasks performed by a hardware accelerator, the method comprising:

receiving a completed task event by a processing circuit of a hardware retire circuit comprising a plurality of input queues, the completed task event having a completed task queue identifier and a completed task identifier, each input queue corresponding to an input stream of tasks and being configured to store input task identifiers corresponding to tasks of the input stream;

identifying an input queue from among the plurality of input queues having an input queue identifier corresponding to the completed task queue identifier;

writing the completed task event into a ready-to-retire queue;

in response to popping the completed task event from the ready-to-retire queue, determining, by the processing circuit, whether the completed task identifier of the completed task event matches an input task identifier of an input task at a head of the input queue having the input queue identifier corresponding to the completed task queue identifier;

in response to determining a match, popping the task at the head of the input queue; and output a task retirement event corresponding to the input task based on the determination.

9. The method of claim 8, further comprising:

in response to determining a mismatch, updating a ready-to-retire table stored in a memory of the hardware retire circuit to indicate that the task associated with the completed task event is ready to be retired; and after popping the task at the head of the input queue:

determining whether a second input task identifier of a second input task at an updated head of the input queue and the input queue identifier match an entry in the ready-to-retire table; and in response to determining a match:

popping the task at the updated head of the input queue;

removing the second input task from the ready-to-retire table; and outputting a second task retirement event corresponding to the second input task.

10. The method of claim 8, wherein the processing circuit comprises a plurality of retire sub-circuits corresponding to one of the plurality of input queues, wherein a retire sub-circuit of the plurality of retire sub-circuits comprises:

a local ready-to-retire table of a memory of the retire sub-circuit; and a processing logic circuit configured to manage the input queue associated with the retire sub-circuit.

11. The method of claim 10, further comprising:

comparing, by the local ready-to-retire table, the completed task queue identifier with the input queue identifier of the input queue associated with the retire sub-circuit;

updating the local ready-to-retire table to indicate that the task associated with the completed task event is ready to be retired;

determining, by the processing logic circuit, whether the completed task queue identifier and the completed task identifier match the input task identifier by determining whether the input task identifier of the input queue associated with the retire sub-circuit matches the completed task identifier in the local ready-to-retire table; and in response to determining a match, popping, by the processing logic circuit, the task at the head of the input queue associated with the retire sub-circuit and output the task retirement event corresponding to the input task.

12. The method of claim 10, further comprising:

selectively granting, by an arbitrator circuit, the plurality of retire sub-circuits access to output the task retirement event to a signal semaphore circuit shared by the plurality of retire sub-circuits.

13. The method of claim 8, further comprising:

determining whether the completed task queue identifier and the completed task identifier match the input task identifier of an input task by comparing the input task identifier of the input task at the head of the input queue associated with the completed task queue identifier with the completed task identifier; and in response to determining a match, popping the completed task event from a completed task queue stored in a memory of the hardware retire circuit configured to store a plurality of completed task events comprising the completed task event.

14. The method of claim 13, further comprising, in response to determining a mismatch:

popping the completed task event from the completed task queue; and updating a global ready-to-retire table stored in a memory of the hardware retire circuit to indicate that the task associated with the completed task event is ready to be retired.

15. A non-transitory, computer readable medium storing instructions that, when executed, cause a processor to configure a hardware retire circuit for retiring tasks using input queues and a ready-to-retire queue, the hardware retire circuit comprising:

a plurality of input queues, each input queue corresponding to an input stream of tasks and being configured to store input task identifiers corresponding to tasks of the input stream; and processing logic configured to:

receive a completed task event having a completed task queue identifier and a completed task identifier;

identify an input queue from among the plurality of input queues having an input queue identifier corresponding to the completed task queue identifier;

write the completed task event into the ready-to-retire queue; in response to popping the completed task event from the ready-to-retire queue, determine whether the completed task identifier of the completed task event matches an input task identifier of an input task at a head of the input queue having the input queue identifier corresponding to the completed task queue identifier;

in response to determining a match, pop the task at the head of the input queue; and output a task retirement event corresponding to the input task based on the determination.

16. The non-transitory, computer readable medium of claim 15, wherein the hardware retire circuit further comprises a memory storing a ready-to-retire table storing a plurality of entries corresponding to completed task events previously received by the hardware retire circuit, and wherein the processing logic is further configured to, after popping the task at the head of the input queue:

determine whether a second input task identifier of a second input task at an updated head of the input queue and the input queue identifier match an entry in the ready-to-retire table; and in response to determining a match:

pop the task at the updated head of the input queue;

remove the second input task from the ready-to-retire table; and output a second task retirement event corresponding to the second input task.

17. The non-transitory, computer readable medium of claim 15, wherein the processing logic comprises a plurality of retire sub-circuits corresponding to one of the plurality of input queues, wherein a retire sub-circuit of the plurality of retire sub-circuits comprises:

a local ready-to-retire table of a memory of the retire sub-circuit; and a processing logic circuit configured to manage the input queue associated with the retire sub-circuit.

18. The non-transitory, computer readable medium of claim 17, wherein the local ready-to-retire table is configured to:

compare the completed task queue identifier with the input queue identifier of the input queue associated with the retire sub-circuit; and update the local ready-to-retire table to indicate that the task associated with the completed task event is ready to be retired, and wherein the processing logic circuit is configured to:

determine whether the completed task queue identifier and the completed task identifier match the input task identifier by determining whether the input task identifier of the input queue associated with the retire sub-circuit matches the completed task identifier in the local ready-to-retire table; and in response to determining a match, pop the task at the head of the input queue associated with the retire sub-circuit and output the task retirement event corresponding to the input task.

19. The non-transitory, computer readable medium of claim 17, wherein the hardware retire circuit further comprises:

an arbitrator circuit configured to selectively grant the plurality of retire sub-circuits access to output the task retirement event to a signal semaphore circuit shared by the plurality of retire sub-circuits.

20. The non-transitory, computer readable medium of claim 15, wherein the hardware retire circuit further comprises:

a completed task queue configured to store a plurality of completed task events comprising the completed task event, wherein the processing logic is configured to determine whether the completed task queue identifier and the completed task identifier match the input task identifier of an input task by:

comparing the input task identifier of the input task at the head of the input queue associated with the completed task queue identifier with the completed task identifier, wherein the processing logic is further configured to, in response to determining a match, pop the completed task event from the completed task queue, and wherein the processing logic is further configured to, in response to determining a mismatch:

pop the completed task event from the completed task queue; and update a global ready-to-retire table stored in a memory of the hardware retire circuit to indicate that the task associated with the completed task event is ready to be retired.

* * * * *